US007403756B1

(12) United States Patent
Jiacinto et al.

(10) Patent No.: US 7,403,756 B1
(45) Date of Patent: Jul. 22, 2008

(54) HIGHLY-INTEGRATED MEMS-BASED MINIATURIZED TRANSCEIVER

(75) Inventors: Joseph F. Jiacinto, Mount Vernon, IA (US); Robert A. Newgard, Central City, IA (US); Robert C. Potter, Marion, IA (US); Manas K. Roy, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 129 days.

(21) Appl. No.: 11/603,392

(22) Filed: Nov. 22, 2006

(51) Int. Cl.
*H04B 1/16* (2006.01)
*H04B 1/22* (2006.01)
*H04B 1/40* (2006.01)

(52) U.S. Cl. .................. 455/191.1; 455/77; 455/191.3; 455/338

(58) Field of Classification Search ............. 455/73, 455/77, 150.1, 188.1, 191.1, 191.3, 313, 455/334, 338–340
See application file for complete search history.

(56) References Cited

U.S. PATENT DOCUMENTS

2007/0207761 A1* 9/2007 LaBerge et al. .......... 455/277.1

* cited by examiner

*Primary Examiner*—David Mis
(74) *Attorney, Agent, or Firm*—Nathan O. Jensen; Kyle Eppele

(57) ABSTRACT

The present invention is directed to a highly-integrated MEMS-based miniaturized transceiver. The transceiver utilizes a low band front-end to direct sample low band signals and a high band front-end to translate high band signals that cannot be directly sampled to low band before low band front-end processing. The low band front-end comprises an array of High-Q MEMS (microelectromechanical systems)-based filters/resonators separated by isolation amplifiers in selectable cascade with narrower bandwidth filters. Dynamic tuning ability is provided through the isolation amplifiers and the sample frequency of the analog-to-digital converter. This architecture is amenable to monolithic fabrication. The input frequency range is scalable with analog-to-digital conversion sampling rate improvements. Re-utilization of filters is spatially efficient and cost effective. Tuning time is limited only by the analog-to-digital conversion and digital signal processing, not synthesizer settling times. This architecture eliminates major sources of traditional intermodulation distortion and reduces complex hardware, increasing reliability.

21 Claims, 3 Drawing Sheets

HIGHLY-INTEGRATED MEMS-BASED MINIATURIZED TRANSCEIVER

FIELD OF THE INVENTION

The present invention relates generally to radio frequency (RF) circuits and components and more particularly to a highly-integrated microelectromechanical systems (MEMS)-based miniaturized transceiver.

BACKGROUND OF THE INVENTION

Radio/microwave frequency receivers and transmitting systems typically rely on a superheterodyne architecture to couple high-frequency signals from the antenna to a baseband processor. Superheterodyne frequency receivers and transmitting systems spanning many octaves of frequency coverage typically require multiple conversion steps and intermediate frequencies to down-convert to a final processing frequency. Frequency filters are heavily relied upon to channelize bands of operation and reject interference. Unfortunately, these filters typically comprise a large volume of the overall system size and are not amenable to monolithic fabrication, requiring extensive and costly touch labor (also direct labor, factory labor costs that can be easily traced to individual units of product). Radio/microwave frequency receivers and transmitting systems also rely on highly linear and low-loss switches to select between channels.

Conventional approaches to reducing transceiver complexity include direct-conversion transceivers, SAW filters, high-Dk distributed element filters, varactor-based agile filters, and FET semiconductor switches. However, direct-conversion transceivers suffer from DC offset errors and poor second order intermodulation performance. SAW filters are inherently narrow band, lossy, have poor group delay response, and are not amenable to monolithic integration. High-Dk distributed element filters are lossy and still consume appreciable size at lower frequencies. Varactor-based agile filters typically have high loss, modest intermodulation performance, limited tuning range, and complex biasing requirements. FET semiconductor switches are lossy, exhibit poor isolation, and are prone to intermodulation distortion.

Consequently, it would be desirable to reduce the size and complexity of transceivers with highly linear, low-loss filters which can be monolithically integrated.

SUMMARY OF THE INVENTION

Accordingly, the present invention is directed to a highly-integrated MEMS-based miniaturized transceiver. The transceiver may utilize a low band front-end to process low band signals by direct sampling and a high band front-end to translate high band signals that cannot be directly sampled to a low band before processing them with the low band front-end.

The low band front-end may comprise an array of High-Q (quality factor) MEMS (microelectromechanical systems)-based filters/resonators separated by isolation amplifiers in selectable cascade with narrower bandwidth filters in order to mitigate analog-to-digital conversion overload protection and make continuous coverage direct sampling feasible at a greater frequency range. In this way, the overall number of filters to achieve a minimum resolution bandwidth specification may be reduced. The isolation amplifiers may allow dynamic tuning of the filters/resonators without impacting termination impedances of adjacent section during the electrical tuning process. The isolation amplifiers may also aid in improving the noise figure and reducing insertion loss and may be powered down when a selected filter path is not in use. The sample frequency of the analog-to-digital converter (regulated by a clock which is controlled by a numerically-controlled oscillator) may provide tuning ability, to shift the frequency of the incident signal into the resultant filter center frequency.

This architecture is more amenable to monolithic fabrication than superheterodyne architectures. This architecture also eliminates the need for multiple local oscillators for the low band front-end. The input frequency range is scalable with analog-to-digital conversion sampling rate improvements. Re-utilization of filters is spatially efficient and cost effective. Tuning time is limited only by the analog-to-digital conversion and digital signal processing, not synthesizer settling times. This architecture eliminates major sources of traditional intermodulation distortion and reduces complex hardware, increasing reliability.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

Figure 1:
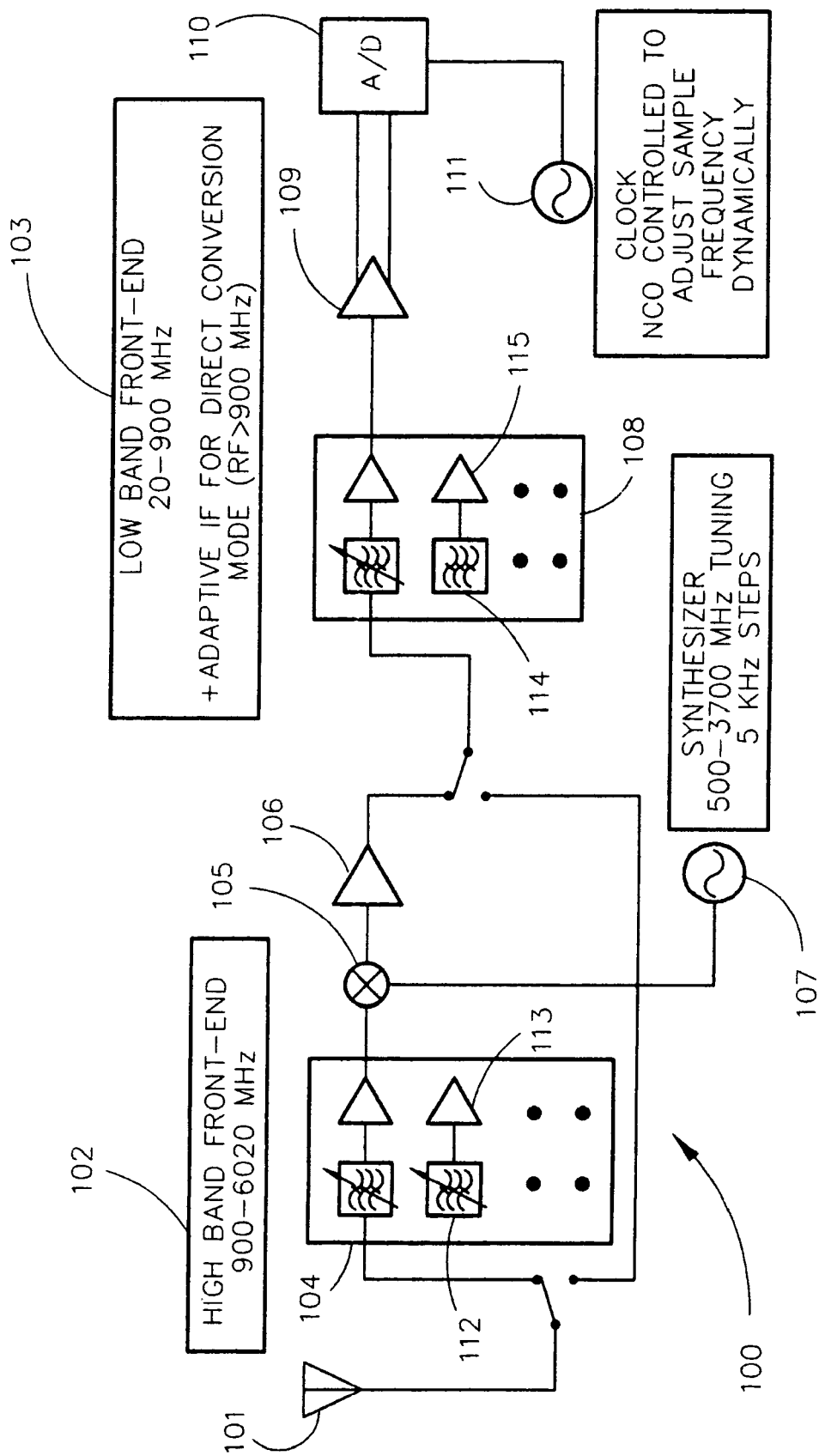
FIG. 1 is a block diagram illustrating an analog signal processing receiver architecture in accordance with an exemplary embodiment of the present invention.

Referring generally to FIG. 1; an exemplary embodiment of the architecture of a receiver 100 in accordance with the present invention is shown. The receiver 100 may be incorporated in a transceiver. The architecture of the receiver 100 may comprise an antenna 101, a high band front-end 102 and a low band front-end 103. The high band front-end 102 may process signals received by the antenna 101 in the high band, which may be the 900-6020 MHz band. The low band front-end 103 may process signals received by the antenna 101 in the low band, which may be the 20-900 MHz band. The low band front-end 103 may process signals by direct sampling. The high band front-end 102 may translate the signal from the 900-6020 MHz band to the 20-900 MHz band and then utilize the low band front-end 103 to process the translated signal.

The high band front-end 102 may comprise an array 104 of MEMS (microelectromechanical systems)-based filters/resonators 112, a mixer 105, a synthesizer 107, and an amplifier 106. The synthesizer 107 may be tunable in a range between 500-3700 MHz with 5 KHz steps. The high band signal from the antenna 101 may be passed into the high band front-end 102 through the array 104 of MEMS-based filters/resonators 112 and into the mixer 105. The mixer 105 may mix the passed signal with the synthesizer 107 output and pass the mixed signal through the amplifier 106 to the low band front-end 103 for further processing. In alternative embodiments the high band front-end 102 may utilize other components than the array 104 of MEMS-based filters/resonators 112 to translate the high band signal into a low band signal for further processing by the low band front-end 103.

Figure 2:
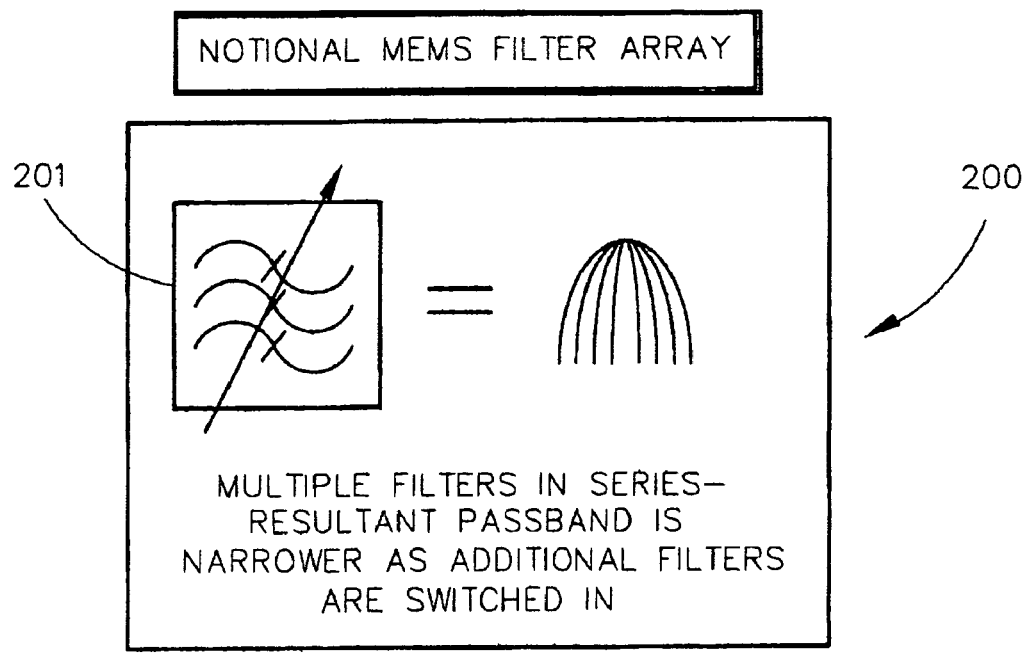
FIG. 2 is a block diagram illustrating the selectable cascading of a MEMS-based filter/resonator array in accordance with an exemplary embodiment of the present invention.
Figure 3:
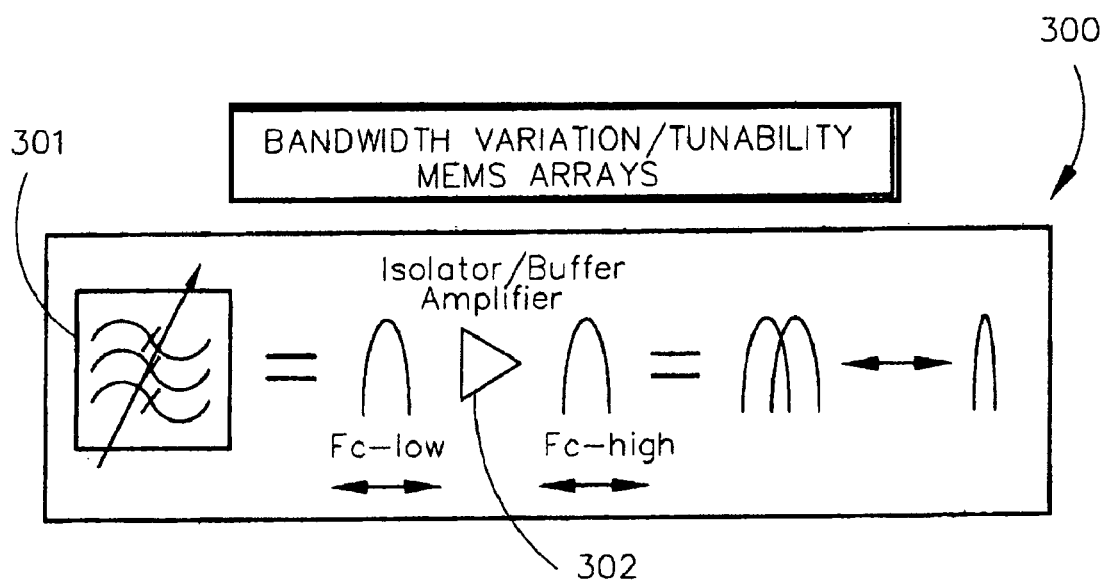
FIG. 3 is a block diagram illustrating the bandwidth variation/tenability of a MEMS-based filter/resonator array utilizing isolation/buffer amplifiers in accordance with an exemplary embodiment of the present invention.

The array 104 of MEMS-based filters/resonators 112 in the high band front-end 102 may be separated by isolation amplifiers 113 and may be in selectable cascade with narrower bandwidth filters to achieve greater rejection and smaller resolution bandwidths. In this way the overall number of filters to achieve a minimum resolution bandwidth specification may be reduced. Referring now to FIG. 2, the selectable cascading of an array 200 of MEMS-based filters/resonators is illustrated. Referring again to FIG. 1, the isolation amplifiers 113 may allow dynamic tuning of the MEMS-based filters/resonators 112 without impacting termination impedances of adjacent section during the electrical tuning process. The isolation amplifiers 113 may aid in improving noise figure and reducing insertion loss and may be powered down when a selected filter path is not in use. Referring now to FIG. 3, the bandwidth variation/tenability of an array 300 of MEMS-based filters/resonators 301 separated by isolation amplifiers 302 is illustrated.

Referring again to FIG. 1, the tow band front-end 103 may comprise an array 108 of MEMS-based filters/resonators 114, an amplifier 109, an analog-to-digital converter 110, and a clock 111 controlled by a numerically controlled oscillator. The low band signal from the antenna 101 or the translated signal from the high band front-end 102 may be passed into the low band front-end 103 through the array 108 of MEMS-based filters/resonators 114 and through the amplifier 109 into the analog-to-digital converter 110. The sample frequency of the analog-to-digital converter 110 may be controlled by the clock 111, which may be controlled by the numerically controlled oscillator. The sample frequency of the analog-to-digital converter 110 may provide tuning ability, to shift the frequency of the incident signal into the resultant filter center frequency.

The array 108 of MEMS-based filters/resonators 114 in the low band front-end 103 may comprise a 3 by 3 array 108 of MEMS-based filters/resonators 114 separated by isolation amplifiers 115. The MEMS-based filters/resonators 114 in the array 108 of MEMS-based filters/resonators 114 may be in selectable cascade with narrower bandwidth filters to achieve greater rejection and smaller resolution bandwidths. In this way the overall number of filters to achieve a minimum resolution bandwidth specification may be reduced. Referring now to FIG. 2, the selectable cascading of an array 200 of MEMS-based filters/resonators is illustrated. Referring again to FIG. 1, the isolation amplifiers 115 may allow dynamic tuning of the filters/resonators 114 without impacting termination impedances of adjacent section during the electrical tuning process. The isolation amplifiers 115 may aid in improving the noise figure and reducing insertion loss and may be powered down when a selected filter path is not in use. Referring now to FIG. 3, the bandwidth variation/tenability of an array 300 of MEMS-based filters/resonators 301 separated by isolation amplifiers 302 is illustrated. Referring again to FIG. 1, tunable transmission zeroes on either side of the pass band may be implemented monolithically to provide notch filtering of strong interferers which would otherwise overload the low band front-end 103.

The MEMS-based filters/resonators 112 and 114 may comprise High-Q (quality factor) MEMS-based filters/resonators 112 and 114. The MEMS-based filters/resonators 112 and 114 may comprise monolithically fabricated MEMS switch-selectable, Ultra-Compact Vertical Caps (VCAPS) combined with off-chip lumped inductors to create low-loss, small, highly linear frequency agile filters. The MEMS-based filters/resonators 112 and 114 may comprise monolithic (two or more elements fabricated on a single chip) arrays of tuneable bandwidth fixed frequency IF (intermediate frequency) filters constructed with "dielectrically transduced" MEMS resonators.

The array 104 of MEMS-based filters/resonators 112 of the high band front-end 102 and the array 108 of MEMS-based filters/resonators 114 of the low band front-end 103 may be monolithically integrated. The low band front end 103 may be monolithically integrated. The low band front end 103 may comprise an ASIC (application specific integrated circuit).

The architecture of the receiver 100 utilizes direct sampling (conversion utilizing an analog-to-digital converter for digital signal processing with a minimum of analog processing) to eliminate multiple super-heterodyne frequency conversion stages and re-utilizes the low band front-end 103 as the IF filter for the high band frequencies which cannot be directly sampled. Arrays 104 and 108 of High-Q MEMS-based filters/resonators 112 and 114 mitigate analog-to-digital conversion overload protection and make continuous coverage direct sampling feasible at a greater frequency range. This architecture eliminates the need for multiple local oscillators for the low band front-end 103. The input frequency range is scalable with analog-to-digital conversion sampling rate improvements. Re-utilization of filters is spatially efficient and cost effective. The elimination of multiple frequency conversion stages, multiple local oscillators, and filter re-utilization reduce the overall size of the receiver. Tuning time is limited only by the analog-to-digital conversion and digital signal processing, not synthesizer settling times. This architecture eliminates major sources of traditional intermodulation distortion and reduces complex hardware, increasing reliability.

Figure 4:
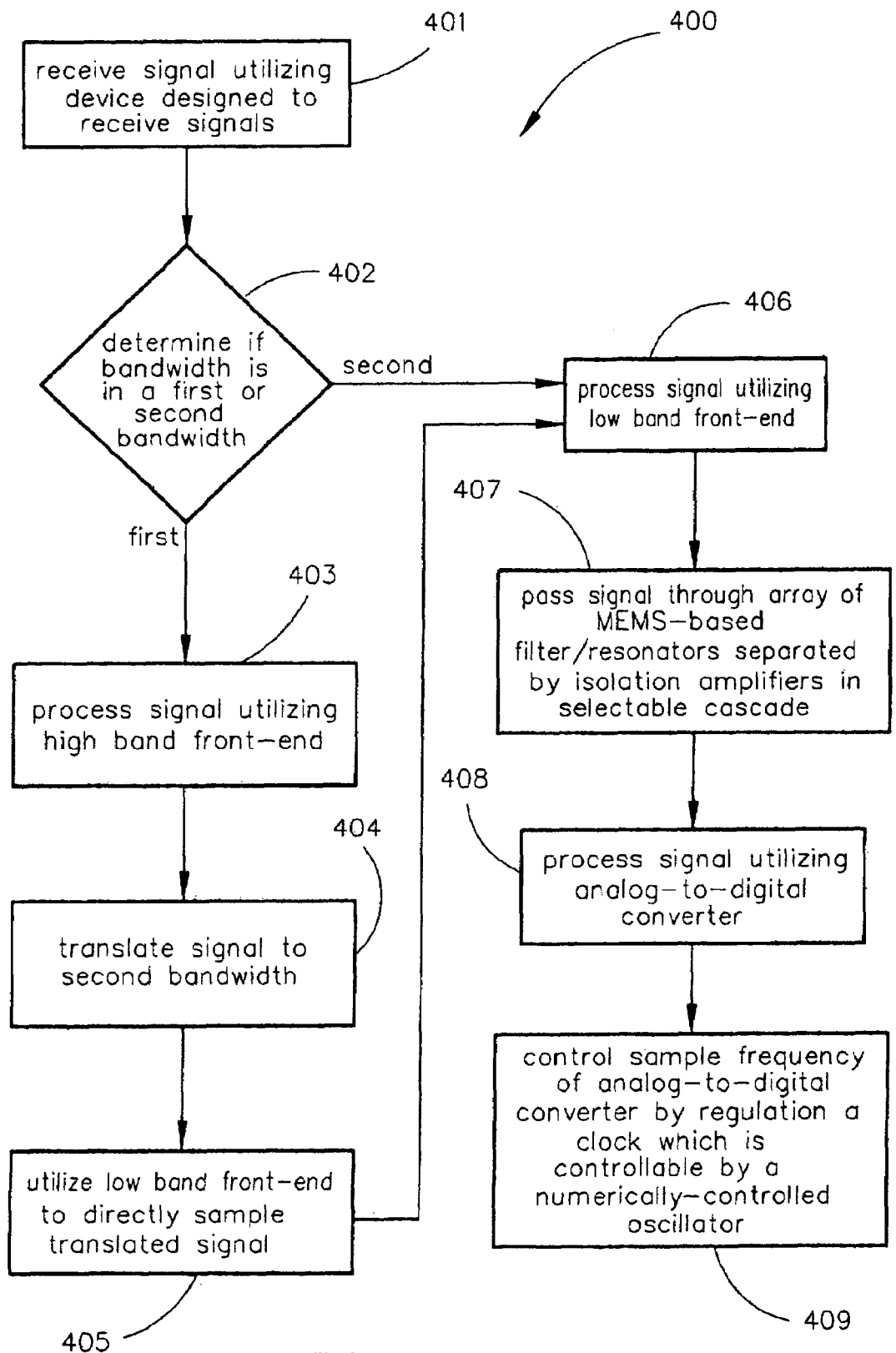
FIG. 4 is a flowchart illustrating a method of practicing an exemplary embodiment of the present invention.

Referring now to FIG. 4, a method 400 of processing analog signals utilizing a receiver architecture in accordance with an exemplary embodiment of the present invention is shown. In step 401, a signal is received utilizing a device designed to receive signals. In step 402, a determination is made whether the bandwidth of the received signal is within a first or second bandwidth. If the bandwidth of the received signal is within the first bandwidth the signal is processed utilizing a high band front-end in step 403. If the bandwidth of the received signal is within the second bandwidth the signal is processed utilizing a low band front-end in step 406. In step 403, the received signal is within the first bandwidth and is processed utilizing the high band front-end. In step 404, the received signal is translated from the first bandwidth to the second bandwidth. In step 405, the low band front-end is utilized to directly sample the translated signal. In step 406, the received signal or the translated signal is processed utilizing the low band front-end. In step 407, the received or translated signal is passed through an array of MEMS-based filters/resonators separated by isolation amplifiers in selectable cascade. In step 408, the received or translated signal is processed utilizing an analog-to-digital converter. In step 409, the sample frequency of the analog-to-digital converter is controlled by regulating a clock which is controllable utilizing a numerically-controlled oscillator.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A signal processing apparatus, comprising:
   a high band front-end which processes signals in a first bandwidth; and
   a low band front-end which processes signals in a second bandwidth, comprising:
   one or more isolation amplifiers;
   at least one array of two or more MEMS (microelectromechanical systems)-based components selected from the group consisting of filters and resonators, separated by the one or more isolation amplifiers, in selectable cascade;
   an analog-to-digital converter;
   a clock; and
   a numerically-controlled oscillator;
   wherein signals processed by the low band front-end are passed through the array of MEMS-based components before the signal is processed by the analog-to-digital converter, and the sample frequency of the analog-to-digital converter is regulated by the clock which is controlled by the numerically-controlled oscillator;
   wherein the low band front-end processes signals in the second bandwidth utilizing direct sampling, the high band front-end processes signals in the first bandwidth, the first bandwidth comprising signal frequencies outside the bandwidth of the second bandwidth, the high band front-end translates signals in the first bandwidth to the second bandwidth and utilizes the low band front-end to process the translated signal.

2. The signal processing apparatus as claimed in claim 1, wherein the array of MEMS-based components in the low band front-end is selectably cascade-able from wider bandwidth components to narrower bandwidth components.

3. The signal processing apparatus as claimed in claim 1, wherein the array of MEMS-based components in the low band front-end is monolithically integrated.

4. The signal processing apparatus as claimed in claim 1, wherein the array of MEMS-based components is a three by three array of MEMS-based components.

5. The signal processing apparatus as claimed in claim 1, wherein the low band front-end is monolithically integrated.

6. The signal processing apparatus as claimed in claim 1, wherein the low band front-end is an ASIC (application specific integrated circuit).

7. The signal processing apparatus as claimed in claim 1, wherein the first bandwidth is between approximately 900 MHz and 6020 MHz and the second bandwidth is between approximately 20 MHz and 900 MHz.

8. The signal processing apparatus as claimed in claim 1, wherein the high band front-end comprises:
   one or more isolation amplifiers; and
   at least one array of two or more MEMS (microelectromechanical systems)-based components selected from the group consisting of filters and resonators, separated by the one or more isolation amplifiers, in selectable cascade;
   wherein the high band front-end utilizes the array to translate signals in the first bandwidth to the second bandwidth.

9. The signal processing apparatus as claimed in claim 8, wherein the array of MEMS-based components in the high band front-end is selectably cascade-able from wider bandwidth components to narrower bandwidth components.

10. The signal processing apparatus as claimed in claim 8, wherein the array of MEMS-based components in the high band front-end is monolithically integrated.

11. A method for processing signals, comprising the steps of:
    receiving a signal;
    determining whether the bandwidth of the signal is within a first or a second bandwidth;
    processing the signal utilizing a high band front-end if the bandwidth of the signal is within the first bandwidth, comprising the steps of:
    translating the signal to the second bandwidth; and
    utilizing the low band front-end to directly sample the translated signal; and
    processing the signal utilizing a low band front-end process the signal by direct sampling if the bandwidth of the signal is within the second bandwidth, comprising the steps of:
    passing the signal through at least one array of two or more MEMS-based components selected from the group consisting of filters and resonators, separated by isolation amplifiers, in selectable cascade;
    processing the signal utilizing an analog-to-digital converter; and
    controlling the sample frequency of the analog-to-digital converter by regulating a clock which is controllable utilizing a numerically-controlled oscillator.

12. The method of claim 11, wherein the array of MEMS-based components in the low band front-end is selectably cascade-able from wider bandwidth components to narrower bandwidth components.

13. The method of claim 11, wherein the array of MEMS-based components in the low band front-end is monolithically integrated.

14. The method of claim 11, wherein the array of MEMS-based components is a three by three array of MEMS-based components.

15. The method of claim 11, wherein the low band front-end is monolithically integrated.

16. The method of claim 11, wherein the low band front-end is an ASIC (application specific integrated circuit).

17. The method of claim 11, wherein the first bandwidth is between approximately 900 MHz and 6020 MHz and the second bandwidth is between approximately 20 MHz and 900 MHz.

18. The method of claim 11, wherein the high band front-end comprises:
    one or more isolation amplifiers; and
    at least one array of two or more MEMS (microelectromechanical systems)-based components selected from the group consisting of filters and resonators, separated by the one or more isolation amplifiers, in selectable cascade;
    wherein the high band front-end utilizes the array to translate signals in the first bandwidth to the second bandwidth.

19. The method of claim 18, wherein the array of MEMS-based components in the high band front-end is selectably cascade-able from wider bandwidth components to narrower bandwidth components.

20. The method of claim 18, wherein the array of MEMS-based components in the high band front-end is monolithically integrated.

21. A monolithically integrated chip for signal processing, comprising:

a high band front-end which processes signals in a first bandwidth; and a low band front-end which processes signals in a second bandwidth, comprising:

one or more isolation amplifiers;

at least one array of two or more MEMS (microelectromechanical systems)-based components selected from the group consisting of filters and resonators, separated by the one or more isolation amplifiers, in selectable cascade;

an analog-to-digital converter;

a clock; and a numerically-controlled oscillator;

wherein signals processed by the low band front-end are passed through the array of MEMS-based components before the signal is processed by the analog-to-digital converter, and the sample frequency of the analog-to-digital converter is regulated by the clock which is controlled by the numerically-controlled oscillator;

wherein the low band front-end processes signals in the second bandwidth utilizing direct sampling, the high band front-end processes signals in the first bandwidth, the first bandwidth comprising signal frequencies outside the bandwidth of the second bandwidth, the high band front-end translates signals in the first bandwidth to the second bandwidth and utilizes the low band front-end to process the translated signal.

* * * * *